United States Patent
Pedro

(10) Patent No.: US 8,730,127 B2
(45) Date of Patent: May 20, 2014

(54) METHOD AND SYSTEM FOR DISPLAYING A PANORAMIC VIEW TO AN OPERATOR

(75) Inventor: Erez Pedro, Zichron Yaacov (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 482 days.

(21) Appl. No.: 13/121,376

(22) PCT Filed: Oct. 1, 2009

(86) PCT No.: PCT/IL2009/000944
§ 371 (c)(1),
(2), (4) Date: Mar. 28, 2011

(87) PCT Pub. No.: WO2010/041240
PCT Pub. Date: Apr. 15, 2010

(65) Prior Publication Data
US 2011/0175796 A1    Jul. 21, 2011

(30) Foreign Application Priority Data
Oct. 12, 2008   (IL) .......................................... 194701

(51) Int. Cl.
*G09G 5/00*        (2006.01)

(52) U.S. Cl.
USPC ............ 345/1.3; 359/642; 345/427; 345/628; 345/629

(58) Field of Classification Search
USPC .................. 345/1.3, 348, 500, 427, 628–629;
359/725, 642; 353/94; 382/284;
89/1.815, 1.812, 125, 142, 27.11, 28.1,
89/28.2, 37.01
See application file for complete search history.

(56) References Cited

U.S. PATENT DOCUMENTS

| 4,982,092 | A | * | 1/1991 | Jehle | 250/332 |
| 5,539,483 | A | * | 7/1996 | Nalwa | 353/94 |
| 5,929,861 | A | * | 7/1999 | Small | 345/427 |
| 5,936,767 | A | * | 8/1999 | Favalora | 359/462 |
| 6,144,501 | A | * | 11/2000 | Nalwa | 359/725 |
| 6,285,365 | B1 | | 9/2001 | Nalwa | |
| 6,700,711 | B2 | * | 3/2004 | Nalwa | 359/725 |
| 7,123,777 | B2 | * | 10/2006 | Rondinelli et al. | 382/284 |
| 7,149,367 | B2 | | 12/2006 | Cutler | |
| 7,224,326 | B2 | * | 5/2007 | Sefton | 345/8 |
| 2011/0096089 | A1 | * | 4/2011 | Shenhav et al. | 345/619 |
| 2012/0155786 | A1 | * | 6/2012 | Zargarpour et al. | 382/284 |

FOREIGN PATENT DOCUMENTS

| EP | 0 982 944 A1 | 3/2000 |
| EP | 0 982 945 A1 | 3/2000 |
| EP | 1 182 465 A2 | 2/2002 |
| WO | WO 98/47291 A2 | 10/1998 |

OTHER PUBLICATIONS

Sun, Y. et al. "An Object Tracking and Global Localization Method using Omnidirectional Vision System", Proceedings of the 5th World Congress on Intelligent Control and Automation, vo. 6, Jun. 15-19, 2004, pp. 4730-4735.

* cited by examiner

*Primary Examiner* — Lun-Yi Lao
*Assistant Examiner* — Kelly B Hegarty
(74) *Attorney, Agent, or Firm* — Merchant & Gould P.C.

(57) ABSTRACT

A method for displaying to an operator a rectangular image having a wide field of view of a scene, includes forming a virtual cylinder from the rectangular image, as if it was first printed on a transparent sheet such that it is visible from both sides of the sheet, and then rolled to form the cylinder. A perspective view of the cylinder is provided, vertically dividing the cylinder into two halves. One of the cylinder halves is vertically shifted until there is no overlap between the two halves. The ellipse which is formed between the two halves following the shifting step is defined as an orientation plane.

10 Claims, 6 Drawing Sheets

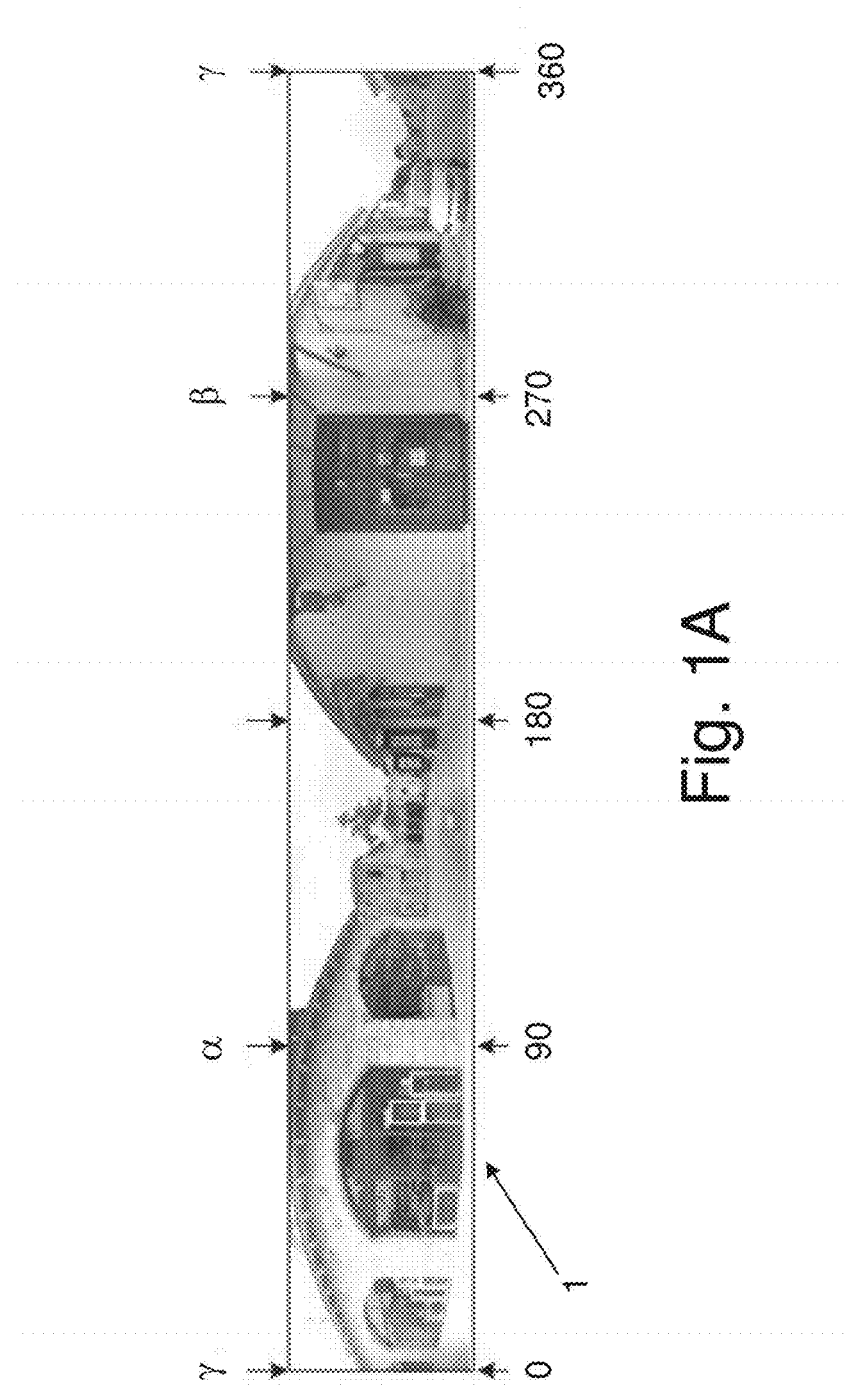

METHOD AND SYSTEM FOR DISPLAYING A PANORAMIC VIEW TO AN OPERATOR

This application is a National Stage Application of PCT/IL2009/000944, filed 1 Oct. 2009, which claims benefit of Ser. No. 194701, filed 12 Oct. 2008 in Israel and which application(s) are incorporated herein by reference. To the extent appropriate, a claim of priority is made to each of the above disclosed applications.

FIELD OF THE INVENTION

The present invention is in the technical field of human computer interaction, or more specifically in the field of displaying a wide field of view of a scene to a user.

BACKGROUND OF THE INVENTION

Many applications require a user to simultaneously monitor a wide field of view, up to a full 360°. Generally it is a very difficult task to display such a wide field of view to the user in such a manner that he will, on one hand perceive the entire scene, and on the other hand inspect specific details within the scene. The limitations of human sensation, perception and cognition make it difficult for a human observer to simultaneously grasp/monitor/supervise a wide visual scene. The common manner by which a human observer overcomes such a difficulty is by scanning the scene, focusing on a section of interest while temporarily neglecting other portions of the scene. The portion of human field of view used for detailed inspection (fovea), such as for reading, is known to be limited to 1°-3° wide. There are various cases where the displayed scene is undergoing frequent and drastic changes that make the task of maintaining the a complete and continuous situation awareness very difficult.

Upon detection of an object or event of interest within the field of view, the observer is required to perform target acquisition, and then determine its relative position and orientation in order to handle it further.

There are various cases in which a control by an operator over a wide scene is necessary. One such example is the case when an operator needs to control a moving vehicle by understanding the surrounding scene as captured from a sensor on board the vehicle. In many cases, the operator needs to rapidly and efficiently react to changes in the scene. Another example is the case of a security control center where the operator needs monitor and supervise an entire area around a protected facility.

The prior art has tried to provide manners and visual aids by which a wide scene is displayed to an observer, in order to allow him to handle the wide view while covering the entire scene.

In the existing solutions of the prior art, the task of acquiring the target is difficult and lengthy because the observer is required to "calculate" in his mind the real-life position of each target of interest, which often includes complicate cognitive tasks.

Several prior art publications have tried so far to overcome said difficulties, by providing a manner of display with visual means. Such prior art solutions are described, for example, in U.S. Pat. Nos. 7,149,367, 6,285,365, 6,700,711, and 6,144,501. Other publications that teach various aspects that relate to the display of a panoramic view are disclosed in WO/98/47291, EP 1,182,465, and Yingjie Sun et al "an object tracking and global localization method using omnidirectional vision system" Intelligent Control and Automation, 2004, WCICA 2004, Fifth World Congress on Hangzhou, China, 15-19 Jun. 2004, IEEE, US vol. 6. 15 Jun. 2004, pages 4730-4735. However, the solutions that have been provided so far do not sufficiently reduce the complexity of detecting and acquiring objects within the scene on one hand, and maintaining a good situational awareness of the entire scene, without overloading the viewer.

It is therefore an object of the present invention to provide a display of a wide visual scene to an operator.

It is another object of the present invention to provide the operator with such a wide scene display which enables him to easily monitor the entire scene.

It is still another object of the present invention to provide such a wide scene display which enables to easily and efficiently detect and acquire objects or events of interest within the displayed scene.

It is still another object of the present invention to provide the operator with such a wide scene display which enables him to efficiently maintain continuous high level of situational awareness of the entire scene.

It is still another object of the present invention to provide the operator with such a wide scene display which enables him to efficiently monitor several concurrent objects of interest within the scene.

SUMMARY OF THE INVENTION

The invention relates to a method for displaying to an operator a rectangular image having a wide field of view of a scene, which comprises the steps of: (a) forming a virtual cylinder from the rectangular image, as if it was first printed on a transparent sheet such that it is visible from both sides of the sheet, and then rolled to form said cylinder; (b) having a perspective view of said cylinder, vertically dividing the cylinder into two halves; (c) vertically shifting one of the cylinder halves until there is no overlap between the two halves; and (d) defining the ellipse which is formed between said two halves following said shifting of step (c) as an orientation plane.

Preferably, the method further includes the step of providing a radial pointer on said orientation plane for each marked object of interest within the scene.

Preferably, each of said radial pointers refers to the azimuth of its respective object of interest.

Preferably, the point of intersection between each radial pointer and the ellipse is positioned vertically below or above its respective object of interest.

Preferably, each vertical marker starts at said point of intersection, and ends at the respective object of interest.

In an embodiment of the invention, the length of each vertical marker is proportional to the elevation of the respective object of interest.

Preferably, the method further comprises the providing of a range marker on said radial pointer indicating the range to the respective object of interest.

Preferably, the marking of one or more objects of interest is performed either by an operator or by a system.

Preferably, when the rectangular image covers less than 360°, the virtual cylinder is respectively partial.

In an alternative of the invention, the virtual cylinder is replaced by a prismatic body having a top base, said base serving as the orientation plane.

BRIEF DESCRIPTION OF THE DRAWINGS

In the drawings:

FIG. 1A shows a panoramic (covering a full 360°) view of a typical street, shown in a typical rectangular fashion;

DETAILED DESCRIPTION OF PREFERRED EMBODIMENTS

As previously mentioned, an observer that needs to monitor a wide visual field of view faces great difficulties in continuously and efficiently detecting objects or events of interest within the scene, acquiring them, and maintaining high level of situational awareness of the entire scene, in order to successfully perform his duty. The present invention provides a method for displaying a wide scene, which overcomes said drawbacks.

FIG. 1A shows a 360° wide panoramic image 1 showing a typical street.

Figure 1B:
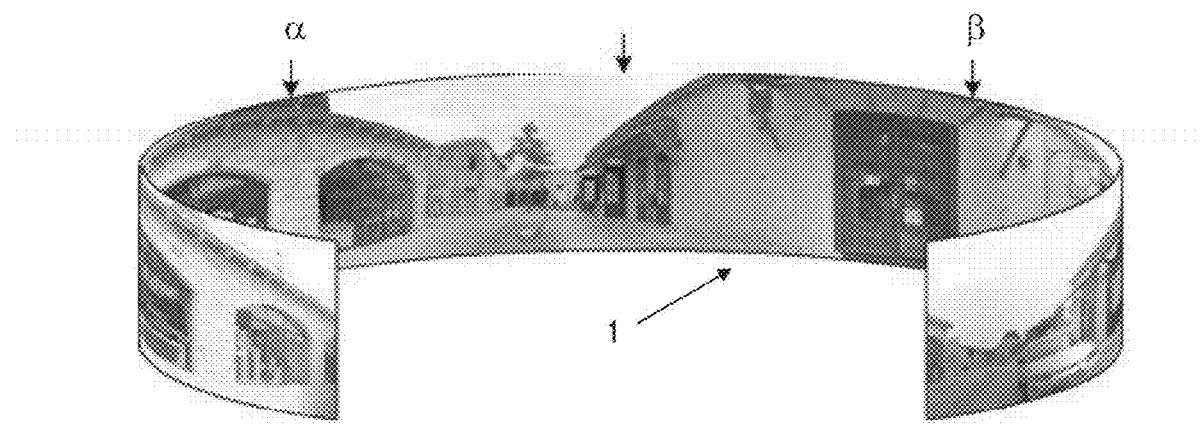
FIG. 1B shows the image 1 of FIG. 1 as if it was printed on a transparent sheet (such that it is visible from both sides of the sheet)
Figure 1C:
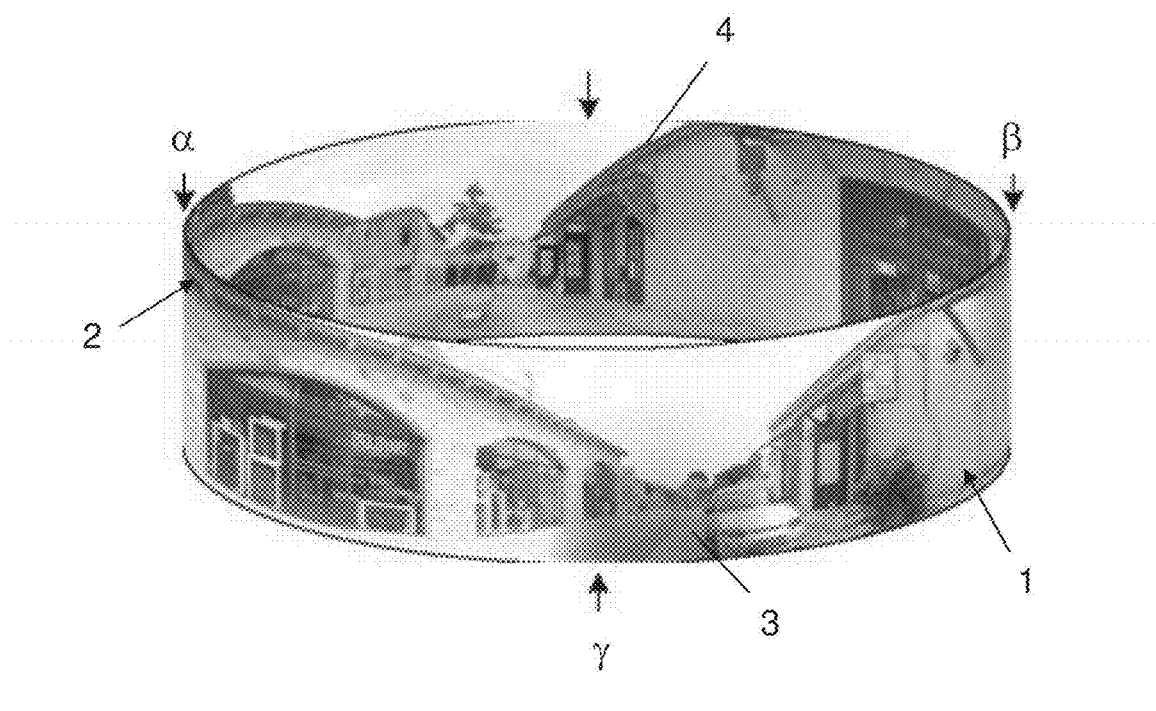
FIG. 1C shows the rectangular image as if it is fully rolled to form a virtual cylinder.
Figure 1D:
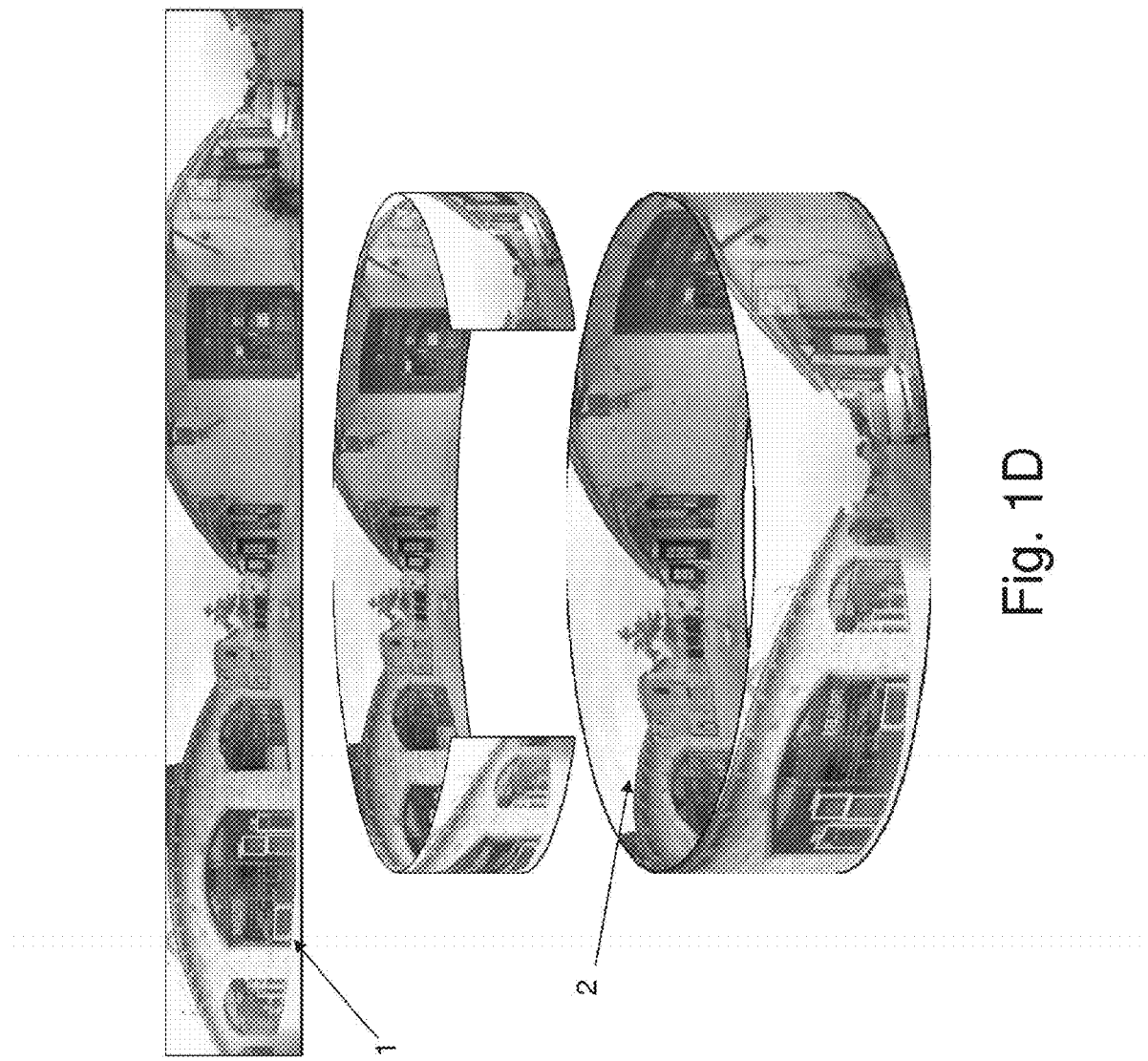
FIG. 1D illustrates the process of creating virtual cylinder, starting from the rectangular image of FIG. 1A, and ending with the virtual cylinder of FIG. 1C.

FIG. 1B shows the image 1 of FIG. 1 as if it was printed on a transparent sheet (such that it is visible from both sides of the sheet). FIG. 1C shows the image 1 as if it is fully rolled to form cylinder 2. Angle γ represents the meeting between the two ends of image 1, i.e., representing both 0° and 360°. The closer half 3 of cylinder 2 shows the portion of image 1 between β and α (270° to 90°) which contains γ (i.e., 360°). Notice that half 3 is showing image 1 mirrored. The farther half 4 of cylinder 2 shows the portion of image 1 between α and β (90° to 270°) which does not contain γ. Cylinder 2 is shown in a perspective view, therefore its rounded top face is seen as an ellipse 5 (hereinafter ellipse 5 will be referred to also as an "orientation plane". Please be noted that FIG. 1C is shown for illustration purpose only, and is not a necessary step for carrying out the invention. FIG. 1D illustrates the process of creating cylinder 2, stating from image 1, and ending with cylinder 2.

Figure 2:
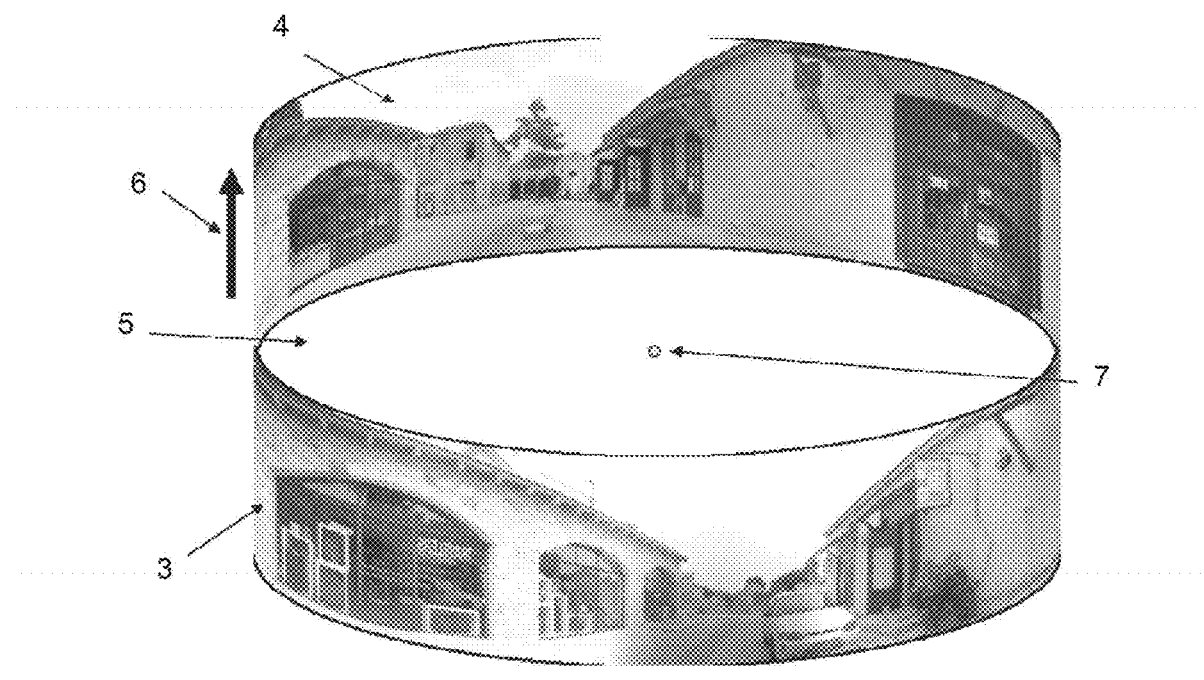
FIG. 2 shows in schematic view the manner of displaying the panoramic image of FIG. 1A, according to an embodiment of the present invention.

FIG. 2 shows in schematic view the manner of displaying the panoramic image 1, according to an embodiment of the present invention. The closer half 3 (mirrored) of cylinder 2 remains in its original position, while the farther half 4 of cylinder 2 is shifted upward as indicated by arrow 6, until there is no overlap between the two halves 3 and 4. Ellipse 5 (the top of original cylinder 2) remains in its original position, and servers as the orientation plane for the operator. The center 7 of ellipse 5, hereinafter referred to as the origin point, represents the virtual position of the camera (or other sensor) that captures the panoramic image 1. It should also be noted that the camera is commonly a video camera, but may also be a stills camera which has a slower refresh rate.

Figure 3:
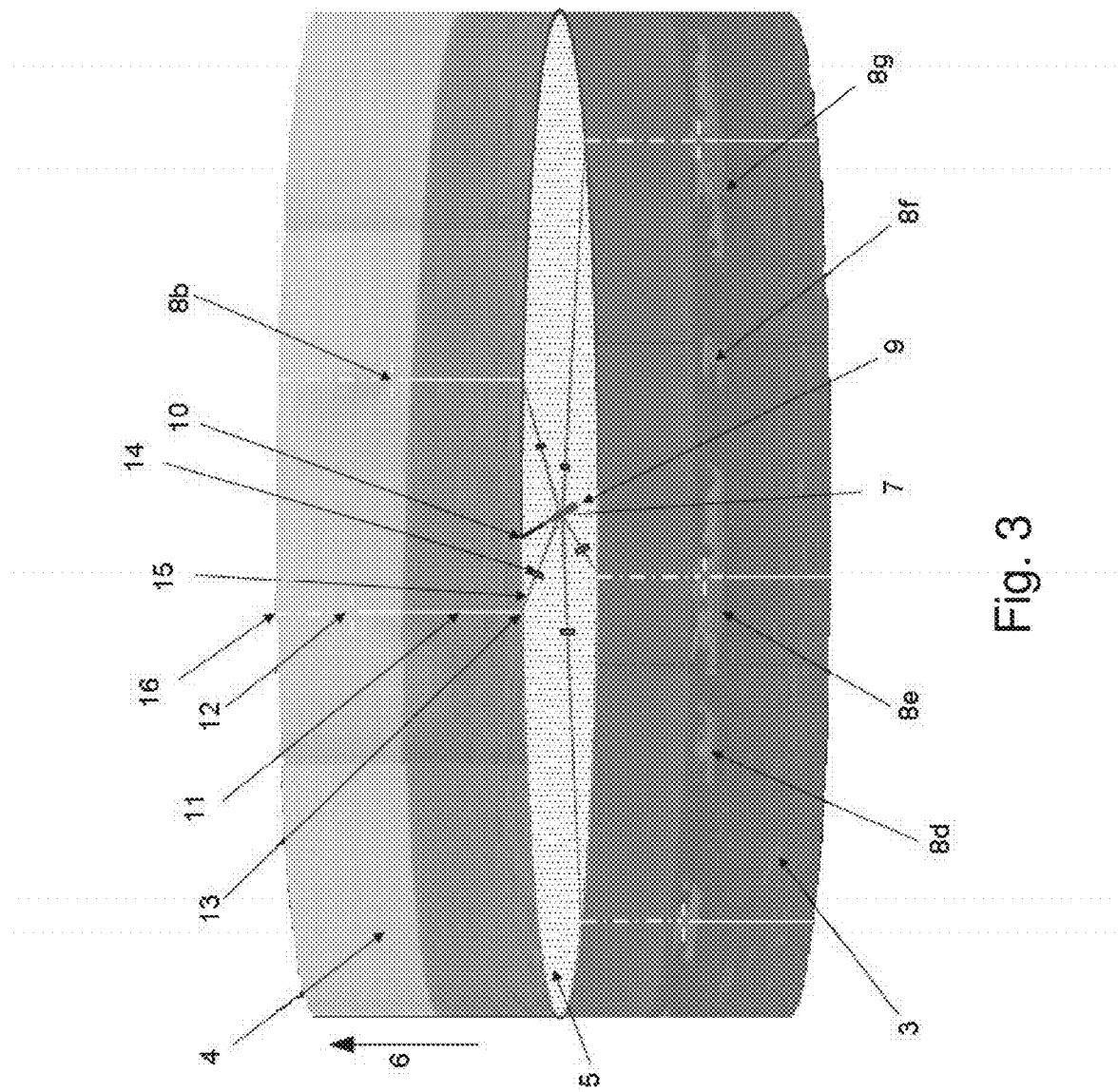
FIG. 3 illustrates a display of a naval control scene according to an embodiment of the present invention.

FIG. 3 illustrates the display of a naval control scene according to an embodiment of the present invention. The scene includes plurality of objects of interest 8a, -8g, several of them are marked in the system (shown by a crosshair). Symbol 9 depicts the platform (in this case a ship) carrying the camera, heading toward point 10 on ellipse (orientation plane) 5. Furthermore, orientation plane 5 may also include direction signs N, S, E and W for the north, south, east and west directions respectively.

Orientation plane 5 summarizes for the operator references to the camera and platform location with their relative orientation and references to all marked objects of interest (in this case objects 8a, 8b, 8c, 8e, and 8g are marked objects, whereas objects 8d and 8f are unmarked.) within the scene. Upon marking an object, for example object 8c, the system generates a vertical marker 11 from object mark 12 toward and until meeting ellipse 5 at point 13. Notice that the proportional vertical position of marker 11 (i.e., between points 13 and 12) relative to the full height of the panoramic image 1 (for example, the distance between points 13 and 16) serves as an indication for the elevation of the marked object in reality. This elevation may be displayed to the operator accordingly. The system further generates a radial pointer 15, starting from origin point 7, until meeting the edge of the orientation plane (for example, point 13). This radial pointer depicts the azimuth (relative or absolute) of the marked object. Please note that the orientation plane 5 shows plurality of radial pointers, each directing respectively to an azimuth of a marked object. In case that the system of the invention is provided with range data for a marked object, the system may also generate a range marker 14, which is proportionally marked on radial pointer 15.

It should be noted that the panoramic image 1, as captured by the camera is typically rectangular, as shown in FIG. 1A. In order to present the two halves 3 and 4 of image 1 in the manner as shown in FIG. 3, i.e., modified such that their respective edges coincide with ellipse 5, without deforming the horizontal dimension, the pixels of each column are shifted vertically until they reach the respective meeting point along the periphery of ellipse 5. Notice that the respective columns of the farther half 4 of image 1 are shifted downward, while the respective columns of the closer half 3 of image 1 are shifted upward accordingly. Note that there is no horizontal shift in any of the image pixels. In this manner, there is no loss of information from the original image 1 and no singularity points are created at the edges (for example, angles α and β of image 1 shown in FIG. 1A).

Note that the least deformed objects are the ones displayed in the horizontal center of the farther and closer halves 4 and 3 respectively. Please also note, however, that the objects shown on the closer half 3 are mirrored. It is therefore preferable for the user to shift objects of higher interest from the closer (mirrored) half 3 to the farther half 4 (preferably at its horizontal center). This is done by performing a virtual rotation of the 360° image respectively. For example, if object 8e becomes an object of highest interest, it is shifted to the center of the farther image 4. This is performed by "rotating" the entire 360° image until bringing it to its desired location at the center of farther image 4. Therefore, all the mirrored images that are shifted due to the "rotation" from the closer image 3 to the farther image 4 are correctly shown (i.e., not mirrored), while all those that are shifted from the farther image 4 to the closer image 3 become mirrored. It should also be noted, that upon any such rotation, the whole orientation plane 5 is rotated, including all its markers such as the platform 9 heading direction, the platform radial pointers, and the radial pointers of the marked objects. Possibly, if the north, south, east, and west pointers are displayed, they are also shifted accordingly.

In a preferred embodiment of the invention the objects of interest are marked either manually by the operator, or automatically by a system that scans the panoramic image and performs marking of objects according to some predefined criteria. For example, a criterion for automatically marking an object by the system as an object of interest may be the first appearance of the object in the scene (as performed by an automatic target recognition algorithm). In another example, the criteria for automatically marking an object may relate to other characteristics of the object (either deduced by the system, its operator, or from an external source) such as its height, its velocity, its shape, its azimuth, etc. Of course, the operator may use other criteria for marking objects, and he may also have the option of unmarking objects that become irrelevant.

The manner of display as shown above has very significant advantages over prior art manners of display of wide panoramic images. When applying the manner of display of the invention, the situational awareness of the operator is improved, because the system displays a directional pointer to each object of interest in the panoramic image, shown similar to the direction one would perceive when such is marked on the top of a virtual cylinder. Thus, the direction of an object of interest is perceived "intuitively" without the need for cognitive manipulation. The outcome is a quicker and simpler task of acquiring the object of interest. Such an outcome is particularly important as the complexity and the quantity of objects of interest in the scene are increased. In addition, the manner of display according to the invention offers a focal point (which is the center 7 of ellipse 5) on the orientation plane, at which the operator could gaze in order to stay informed of the situation in the entire scene. The center 7 of the orientation plane 5 provides an origin from which the operator can find visual guides to each object of interest in the scene. These guides simplify the visual search for their respective object of interest. Furthermore, the vertical arrangement of the entire panoramic image 1 in two halves, improves the coverage of the image by the operator's field of view. This reduces the amount of time in which portions of the entire scene are left unattended. Furthermore, in the present invention all the portions of the image, including all the objects in the scene are shown in full, without any obstruction or horizontal distortion.

It should be noted that the depiction of the image as if forming a virtual cylinder, although advantageous, has been given only as one example. The invention may be similarly apply other virtual prismatic bodies having a top base, such as a rectangular box or an hexagonal prism. Said top base serves as the orientation plane.

It should also be noted that the invention is also applicable for images covering less than the full 360°.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for displaying to an operator a rectangular image having a wide field of view of a scene, comprising the steps of:
    a. forming a virtual cylinder from the rectangular image, as if the image was first printed on a transparent sheet such that the image is visible from both sides of the sheet, and then rolled to form said cylinder;
    b. creating a perspective view of said cylinder, vertically dividing the cylinder into two halves;
    c. vertically shifting one of the cylinder halves until a point at which there is no overlap between the two halves, and at which an ellipse is formed between the two shifted halves; and
    d. defining the ellipse formed between said two halves following said shifting of step (c) as an orientation plane.

2. Method according to claim 1, further providing a radial pointer on said orientation plane for each marked object of interest within the scene, said radial pointer being a line starting at the center of said ellipse, and ending at the edge of said ellipse.

3. Method according to claim 2, wherein each radial pointer refers to the azimuth of the respective object of interest.

4. Method according to claim 2, wherein the point of intersection between each radial pointer and the ellipse is positioned vertically below or above the respective object of interest.

5. Method according to claim 4, further comprising a vertical marker starting at said point of intersection, and ending at the respective object of interest.

6. Method according to claim 5, wherein the length of each vertical marker is proportional to the elevation of the respective object of interest.

7. Method according to claim 2, further comprising providing a range marker on said radial pointer indicating the range from the origin to the respective object of interest.

8. Method according to claim 2, wherein the marking of one or more objects of interest is performed either by an operator or by a system.

9. Method according to claim 1, wherein when the rectangular image covers less than 360°, the virtual cylinder is respectively partial.

10. Method according to claim 1, wherein the virtual cylinder is replaced by a prismatic body having a top base, said base serving as the orientation plane.

* * * * *